United States Patent
Shi et al.

(10) Patent No.: US 10,200,919 B2
(45) Date of Patent: Feb. 5, 2019

(54) METHOD FOR NEIGHBOR CELL MEASUREMENT, BASE STATION AND TERMINAL DEVICE

(71) Applicant: Telefonaktiebolaget LM Ericsson (publ), Stockholm (SE)

(72) Inventors: Cong Shi, Beijing (CN); Gen Li, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/580,541

(22) PCT Filed: Jun. 17, 2015

(86) PCT No.: PCT/CN2015/081623
§ 371 (c)(1),
(2) Date: Dec. 7, 2017

(87) PCT Pub. No.: WO2016/201633
PCT Pub. Date: Dec. 22, 2016

(65) Prior Publication Data
US 2018/0160340 A1    Jun. 7, 2018

(51) Int. Cl.
| | |
|---|---|
| H04W 36/00 | (2009.01) |
| H04W 36/14 | (2009.01) |
| H04W 48/16 | (2009.01) |
| H04W 24/10 | (2009.01) |

(52) U.S. Cl.
CPC ....... *H04W 36/0061* (2013.01); *H04W 24/10* (2013.01); *H04W 36/14* (2013.01); *H04W 48/16* (2013.01)

(58) Field of Classification Search
CPC . H04W 36/0061; H04W 24/10; H04W 36/14; H04W 48/16
See application file for complete search history.

(56) References Cited

U.S. PATENT DOCUMENTS

2010/0075681 A1* 3/2010 Olofsson ........... H04W 36/0061
455/436
2011/0263282 A1 10/2011 Rune et al.
(Continued)

FOREIGN PATENT DOCUMENTS

| CN | 101772036 A | 7/2010 |
|---|---|---|
| CN | 101772097 A | 7/2010 |

(Continued)

OTHER PUBLICATIONS

3GPP, "3GPP TS 32.511 V11.2.0 (Sep. 2012)", 3rd Generation Partnership Project; Technical Specification Group Services and System Aspects; Telecommunication management; Concepts and requirements (Release 11), Sep. 2012, 1-14.

(Continued)

*Primary Examiner* — Chuong A Ngo
(74) *Attorney, Agent, or Firm* — Murphy, Bilak & Homiller, PLLC

(57) ABSTRACT

Embodiments of the invention generally relate to neighbor cell measurement in a communication network. A method implemented by a first base station of a first operator, the first base station having a first cell identity, comprises: sending, to a first neighbor base station of the first operator, a request for a neighbor cell identity of the first neighbor base station, the first neighbor base station being adjacent to the first base station; receiving, from the first neighbor base station, a second cell identity of a second base station of a second operator, the second operator being different from the first operator, and the second base station being adjacent to the first neighbor base station; and determining the first cell identity at least in part based on the received second cell identity. In this way, an effective and efficient way is provided for a BS of an operator to obtain a cell identity of a further BS of a different operator.

20 Claims, 6 Drawing Sheets

(56) References Cited

U.S. PATENT DOCUMENTS

| | | | |
|---|---|---|---|
| 2014/0063136 A1 | 3/2014 | Nakashima et al. | |
| 2015/0063136 A1 | 3/2015 | Shen et al. | |
| 2015/0245327 A1* | 8/2015 | Damnjanovic | H04W 16/14 370/336 |

FOREIGN PATENT DOCUMENTS

| | | |
|---|---|---|
| CN | 101854633 A | 10/2010 |
| CN | 102781008 A | 11/2012 |

OTHER PUBLICATIONS

3GPP, "3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8)", 3GPP TR 32.816 V8.0.0, Dec. 2008, 1-38.

Szilágyi, Péter et al., "Physical Cell ID Allocation in Multi-layer, Multi-vendor LTE Networks", Proc. Int'l Conf. on Mobile Networks and Management (MONAMI), 2012, pp. 156-168.

"Discussion on LAA-LAA coexistence", 3GPP TSG RAN WG1 Meeting #80bis; R1-151622; Belgrade, Serbia, Apr. 20-24, 2015, pp. 1-4.

"PCI Confusion and Collision in LAA System", 3GPP TSG-RAN WG2 Meeting #89bis; R2-151382; Bratislava, Slovakia, Apr. 20-24, 2015, pp. 1-3.

"TP for TR 36.889 v0.1.0 Study on licensed-assisted access using LTE", 3GPP TSG-RAN WG2 Meeting #89bis; R2-151740; Bratislava, Slovakia, Apr. 20-24, 2015, pp. 1-10.

"TP on PCI confusion in LAA", 3GPP TSG-RAN WG2 #89bis; R2-151714; Bratislava, Slovakia, Apr. 20-24, 2015, pp. 1-4.

* cited by examiner

METHOD FOR NEIGHBOR CELL MEASUREMENT, BASE STATION AND TERMINAL DEVICE

TECHNICAL FIELD

Embodiments of the present invention generally relate to the field of communications, and more particularly to a method for neighbor cell measurement, a base station and a terminal device.

BACKGROUND

In a cellular communication, a cell identity (ID) is used to identify a cell that is served by a base station (BS). By means of the cell identity, a terminal device can detect the cell and further be connected to the cell. By way of example, in a third Generation Partnership (3GPP) Long Term Evolution (LTE) network, a cell is assigned to a physical cell identity (PCI), which is a layer 1 cell identity. The PCI is carried in a synchronization signal and broadcast by the BS serving the cell such that the terminal device may detect the PCI and further establish communication with the cell. In particular, during a cell selection/reselection, the terminal device can identify neighbor cells through corresponding cell identities. As used herein, the term "cell selection/reselection" refers to a procedure during which the terminal device selects a suitable cell to camp on in response to, for example, being powered on, leaving a "flight" mode, moving between a plurality of cells, and so on. The term "neighbor cells" refers to at least two cells that are adjacent to and overlap each other.

In the 3GPP LTE network, an eNB is deployed by an operator, and one operator may deploy a number of eNBs in a network. Furthermore, an eNB has three cells. However, there are only about five hundred PCIs available, which is far less than the number of deployed cells. Accordingly, the PCIs have to be reused, which may cause a problem of cell identity collision and/or cell identity collision. As used herein, the term "cell identity collision" refers to a scenario where two neighbor cells use the same cell identity, and therefore the terminal device cannot distinguish the two cells and have access to either of them. The term "cell identity confusion" refers to a scenario where two neighbor cells of a specific cell use the same PCI and the terminal device cannot successfully be handed over to an appropriate one of the two neighbor cells while moving.

In order to ensure a success of the cell selection/reselection, the cell identity collision and confusion have to be avoided. Conventionally, the cell identity collision and confusion may be avoided by assigning distinguishing PCIs to the neighbor cells and the neighbor cells of a specific cell. Such assignment may be implemented through radio network planning of the operator.

Recently, unlicensed spectrums have become efficient complements of licensed spectrums exclusive to individual operators in order to meet an increasing demand for wireless broadband data. The unlicensed spectrums may be shared among a plurality of operators. Accordingly, a plurality of BSs from different operators may operate in a same carrier frequency. In this case, among the BSs of different operators, the problem of the cell identity collision and confusion may also occur. However, in a conventional approach, an operator separately deploys its own cells. Thus, it is very difficult to avoid the problem through the radio network planning.

SUMMARY

Generally, embodiments of the present invention provide an efficient solution for neighbor cell measurement.

In a first aspect, a method implemented by a first base station of a first operator is provided. The method comprises: sending, to a first neighbor base station of the first operator, a request for a neighbor cell identity of the first neighbor base station, the first neighbor base station being adjacent to the first base station; receiving, from the first neighbor base station, a second cell identity of a second base station of a second operator, the second operator being different from the first operator, and the second base station being adjacent to the first neighbor base station; and determining a first cell identity of the first base station at least in part based on the received second cell identity. The corresponding computer program is also provided.

In one embodiment, the step of receiving may further comprise receiving a third cell identity of a third base station of the second operator, the third base station being adjacent to the second base station. The step of determining may comprise determining the first cell identity at least in part based on the received second and third cell identities.

In one embodiment, the method may further comprise: sending, to the first neighbor base station, a further request for a neighbor cell identity of the second base station; and receiving, from the first neighbor base station, a third cell identity of a third base station of the second operator, the third base station being adjacent to the second base station. Furthermore, the step of determining may comprise determining the first cell identity at least in part based on the received second and third cell identities.

In one embodiment, the method may further comprise: detecting a fourth cell identity of a fourth base station of a third operator that is broadcast by the fourth base station, the third operator being different from the first operator. Furthermore, the first cell identity is further determined based on the detected fourth cell identity.

In one embodiment, the method may further comprise broadcasting the determined first cell identity.

In one embodiment, the cell identity includes a physical cell identity.

In a second aspect, a method implemented by a first neighbor base station of a first operator is provided, wherein the first neighbor base station is adjacent to a first base station of the first operator. The method comprising: receiving, from the first base station, a request for a first neighbor cell identity of the first neighbor base station; and transmitting, to the first base station, a second cell identity of a second base station of a second operator, the second operator being different from the first operator, and the second base station being adjacent to the first neighbor base station. The corresponding computer program is also provided.

In one embodiment, the method may further comprise detecting the second cell identity of the second base station that is broadcast by the second base station.

In one embodiment, the method may further comprise: sending, to a terminal device, a request for measuring a second neighbor base station of the second operator, the second neighbor base station being adjacent to the first neighbor base station; and receiving, from the terminal device, the second cell identity of the second base station.

In one embodiment, the step of transmitting may comprise transmitting, to the first base station, a third cell identity of a third base station of the second operator, the third base station being adjacent to the second base station.

In one embodiment, the method may comprise receiving a further request for a neighbor cell identity of the second base station from the first base station. Furthermore, the third cell identity of the third base station is transmitted in response to the further request.

In one embodiment, the method may further comprise sending, to a terminal device, a request for measuring a second neighbor base station of the second operator, the second neighbor base station being adjacent to the first neighbor base station, and the request indicating that a carrier type of the second neighbor base station is a shared carrier type.

In a third aspect, a method implemented by a terminal device is provided. The method may comprise receiving, from a serving base station of a first operator, a request for measuring a second neighbor base station of a second operator, the second neighbor base station being adjacent to the serving base station; obtaining an operator identity of the second neighbor base station; and determining, based on the obtained operator identity, whether the second operator is different from the first operator.

In one embodiment, the method may further comprise in response to the second operator being different from the first operator, transmitting a cell identity of the second neighbor base station to the serving base station.

In one embodiment, the method may further comprise in response to the second operator being different from the first operator, transmitting a further cell identity of a third neighbor base station of the second operator to the serving base station, the third neighbor base station being adjacent to the second neighbor base station.

In one embodiment, the request indicates a carrier type of the second neighbor base station. The step of obtaining may comprise in response to the carrier type being a shared carrier type, obtaining the operator identity of the second neighbor base station.

In one embodiment, the method may further comprise in response to the second operator being different from the first operator, ceasing measuring the second neighbor base station.

In one embodiment, the step of obtaining may comprise detecting the operator identity that is transmitted by the second neighbor base station.

In one embodiment, before the step of obtaining, the method may further comprise detecting a cell identity of the second neighbor base station. Furthermore, the step of obtaining may comprise retrieving, based on the detected cell identity, the operator identity of the second neighbor base station from a mapping table of a cell identity to an operator identity.

In one embodiment, the operator identity and the cell identity may be stored in associated with a predetermined time in the mapping table. Furthermore, the method may further comprise in response to expiration of the predetermined time, detecting a further operator identity of the second neighbor base station.

In a fourth aspect, a first base station of a first operator is provided. The first base station comprises: a first request sending unit configured to send, to a first neighbor base station of the first operator, a request for a neighbor cell identity of the first neighbor base station, the first neighbor base station being adjacent to the first base station; a first cell identity receiving unit configured to receive, from the first neighbor base station, a second cell identity of a second base station of a second operator, the second operator being different from the first operator, and the second base station being adjacent to the first neighbor base station; and a cell identity determining unit configured to determine a first cell identity of the first base station at least in part based on the received second cell identity.

In a fifth aspect, a first neighbor base station of a first operator is provided, wherein the first neighbor base station is adjacent to a first base station of the first operator. The first neighbor base station comprises: a first request receiving unit configured to receive, from the first base station, a request for a first neighbor cell identity of the first neighbor base station; and a first cell identity transmitting unit configured to transmit, to the first base station, a second cell identity of a second base station of a second operator, the second operator being different from the first operator, and the second base station being adjacent to the first neighbor base station.

In a sixth aspect, a terminal device is provided. The terminal device comprises: a second request receiving unit configured to receive, from a serving base station of a first operator, a request for measuring a second neighbor base station of a second operator, the second neighbor base station being adjacent to the serving base station; an operator identity obtaining unit configured to obtain an operator identity of the second neighbor base station; and an operator determining unit configured to determine, based on the obtained operator identity, whether the second operator is different from the first operator.

In a seventh aspect, a first base station of a first operator is provided. The first base station comprises: a processor; and a memory including computer-executable instructions which, when executed by the processor, cause the first base station to: send, to a first neighbor base station of the first operator, a request for a neighbor cell identity of the first neighbor base station, the first neighbor base station being adjacent to the first base station; receive, from the first neighbor base station, a second cell identity of a second base station of a second operator, the second operator being different from the first operator, and the second base station being adjacent to the first neighbor base station; and determine a first cell identity of the first base station at least in part based on the received second cell identity.

In an eighth aspect, a first neighbor base station of a first operator is provided, wherein the first neighbor base station is adjacent to a first base station of the first operator. The first neighbor base station comprises a processor; and a memory including computer-executable instructions which, when executed by the processor, cause the first neighbor base station to: receive, from the first base station, a request for a first neighbor cell identity of the first neighbor base station; and transmit, to the first base station, a second cell identity of a second base station of a second operator, the second operator being different from the first operator, and the second base station being adjacent to the first neighbor base station.

In a ninth aspect, a terminal device is provided. The terminal device comprises a processor, and a memory including computer-executable instructions which, when executed by the processor, cause the terminal device to: receive, from a serving base station of a first operator, a request for measuring a second neighbor base station of a second operator, the second neighbor base station being adjacent to the serving base station; obtain an operator identity of the second neighbor base station; and determine, based on the obtained operator identity, whether the second operator is different from the first operator.

According to embodiments of the present invention, an effective and efficient way is provided for a BS of an operator to obtain a cell identity of a further BS of a different operator. Furthermore, it is possible that the cell identity of the BS of the operator is determined based on the cell identity of the further BS of the different operator. In this way, a cell identity collision and confusion between the BSs may be avoided.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present invention will now be discussed with reference to several example embodiments. It should be understood that these embodiments are discussed only for the purpose of enabling those skilled persons in the art to better understand and thus implement the present invention, rather than suggesting any limitations on the scope of the present invention.

As used herein, the term "terminal device" refers to any terminal having wireless communication capabilities, including, but not limited to, mobile phones, cellular phones, smart phones, personal digital assistants (PDAs), portable computers, image capture devices such as digital cameras, gaming devices, music storage and playback appliances, any portable units or terminals that have wireless communication capabilities, or Internet appliances enabling wireless Internet access and browsing and the like. The term "base station" (BS) may be referred to as eNB, eNodeB, NodeB, base transceiver station (BTS) and the like depending on the technology and terminology used.

As used herein, the terms "first," "second" and "third" may refer to a same element or different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components, and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
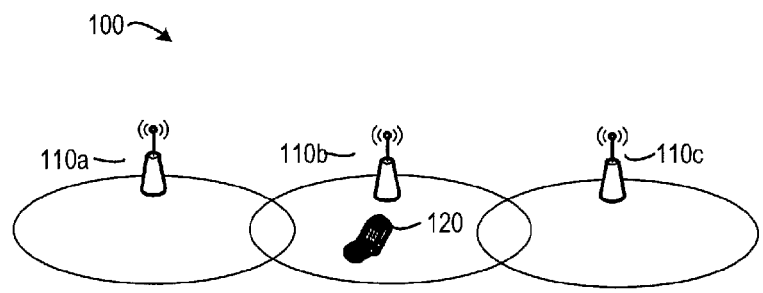
FIG. 1 shows an environment of a communication network in which embodiments of the present invention may be implemented.

FIG. 1 shows an environment of a communication network 100 in which embodiments of the present invention may be implemented. As shown, a terminal device 120 is being served by a BS 110b. With movement of the terminal device 120 towards to a BS 110a or 110c, the terminal device 120 may be handed over to the BS 110a or 110c in order to ensure a communication quality of the terminal device 120. There are illustrated one terminal device 120 and three BSs 110a, 110b and 110c with respective three cells in FIG. 1. This is only for the purpose of illustration without suggesting the limitations on the number of the terminal devices, the BSs and the cells. There may be any suitable number of the terminal devices in communication with any suitable number of the BSs, and a BS may have any suitable number of cells. According to embodiments of the present invention, the BSs 110a, 110b and 110c may be deployed by one operator or a plurality of operators.

The network 100 may follow any suitable communication standards, such as LTE-Advanced (LTE-A), LTE, Wideband Code Division Multiple Access (WCDMA), Code Division Multiple Access (CDMA) and Global System for Mobile Communications (GSM) and the like. Furthermore, the communications between the terminal device 120 and the BS 110a, 110b or 110c in the network 100 may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

In the network 100, a cell served by the BS 110a, 110b or 110c is identified by a cell identity. The terminal device 120 may use the cell identity to detect the cell and further communicate with the cell. In the context of the present invention, the cell identity may be any suitable identity that can identify the cell. An example of the cell identity may be the PCI in the LTE network.

As described above, if the cell identities of the BSs 110a and 110b are the same, the terminal device 120 will not distinguish the two BSs 110a and 110b, and the cell identity collision will occur. If the cell identities of the BSs 110a and 110c are the same, when the terminal device 120 moves towards the BS 110c, the terminal device 120 will not be handed over to the appropriate handover target BS 110c. Thus, the cell identity confusion will occur.

In the conventional approach, in the case that the BSs 110a, 110b and 110c belong to one operator, the cell identity collision and confusion thereamong may be avoided by means of the radio network planning of the operator. However, if the BSs 110a, 110b and 110c are deployed by a plurality of operators, it will be difficult to avoid the cell identity collision and confusion because the operators separately deploy their own networks.

Figure 2:
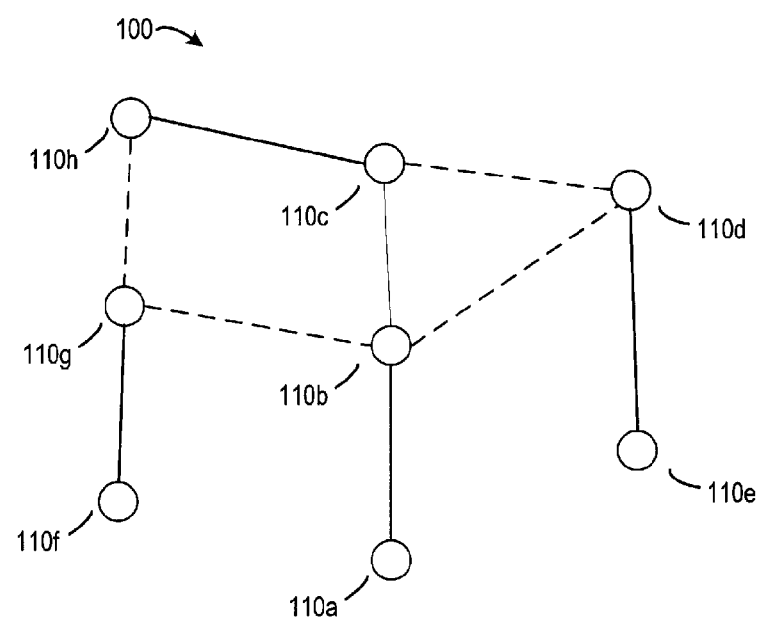
FIG. 2 shows another environment of a communication network in which some embodiments of the present invention may be implemented.

FIG. 2 shows another environment of the network 100 in which some embodiments of the present invention may be implemented. As shown, in addition to the three BSs 110a-110c as shown in FIG. 1, the network 100 further comprises other five BSs 110d-110h. The BSs 110a, 110b, 110c and 110h are deployed by a first operator, and the BSs 110d-110g are deployed by a second operator. According to embodiments of the present invention, the first and second operators may be the same or different. In this example, they are two different operators. It would be appreciated that the two operators is only for the purpose of illustration without suggesting the limitations on the number of operators. The BSs in the network 100 may be deployed by any suitable number of operators.

In the case that the BS 110a is a new BS and the other BSs 110b-110g are existing BSs, the new BS 110a has to be assigned to a cell identity by the first operator. As used herein, the term "new BS" refers to a BS that is newly deployed and has no cell identity. The term "existing BS" refers to a BS that has already be assigned to a cell identity. In order to avoid the potential cell identity collision and confusion between the BS 110a and its surrounding BSs, such as the BSs 110b-110g, the cell identity of the BS 110a has to be different from the cell identities of its neighbor BSs 110b, 110f and 110e and the cell identities of neighbor BSs 110c, 110d and 110g of its neighbor BSs 110b, 110f and 110e. In the context of the present invention, neighbor BSs refers to at least two BSs of which the cells are adjacent to and overlap each other. Furthermore, a BS surrounding another BS means that the distance between the two BSs is lower than a predetermined distance threshold, and thereby a cell identity collision and confusion may possibly occur between them.

As described above, the BSs 110a, 110b and 110c are all deployed by the first operator. Accordingly, the cell identity collision and confusion between the BS 110a and the BSs 110b and 110c may be avoided by means of the radio network planning of the first operator. Since the BS 110a and the BSs 110d-110g are deployed by the different operators, the cell identities of the BSs 110d-110g cannot be used to determine the cell identity of the BS 110a. The reason is that the first operator has no access to the deployment information of the second different operator. As a result, the potential cell identity collision and confusion between the BS 110a and the BSs 110d-110g may occur.

Figure 3:
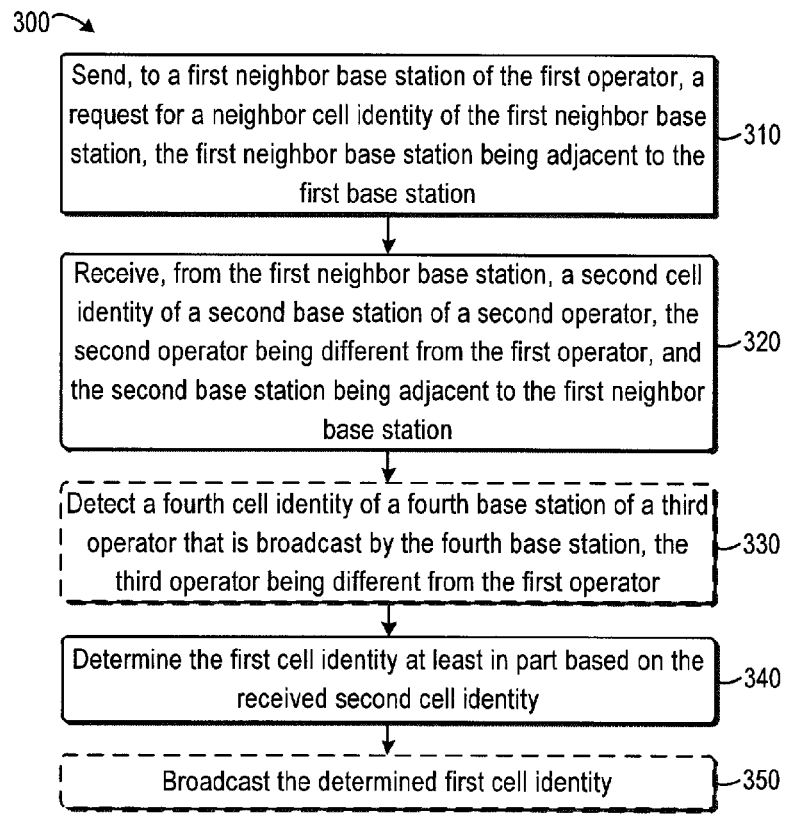
FIG. 3 shows a flowchart of a method implemented by a base station in accordance with one embodiment of the present invention.

FIG. 3 shows a flowchart of a method 300 implemented by a base station in accordance with one embodiment of the present invention. It would be appreciated that the method 300 may be implemented in any of the BSs 110a-110h as shown in FIG. 1 or 2. For the purpose of illustration, the method 300 will be described below from the perspective of the BS 110a with reference to FIG. 2.

As shown, the method 300 is entered at step 310 where the first BS 110a of the first operator sends to a first neighbor BS 110b of the first operator a request for a neighbor cell identity of the first neighbor BS 110b. In the context of the present invention, the neighbor cell identity of a specific BS includes a cell identity of a neighbor BS of the specific BS, wherein the neighbor BS and the specific BS may belong to one operator or two different operators.

According to embodiments of the present invention, the first BS 110a may use any suitable way to send the request to the first neighbor BS 110b. For example, generally, there is a direct communication interface between two neighbor BSs of the same operator. An example of such an interface may be an X2 interface in the LTE network. Accordingly, the first BS 110a may send the request to the first neighbor BS 110b via the direct communication interface therebetween.

Next, the method 300 proceeds to step 320 where the first BS 110a receives from the first neighbor BS 110b a second cell identity of a second BS of a second operator, such as the BS 110d or 110g. The second BS 110d or 110g is adjacent to the first neighbor BS 110b, and the second operator is different from the first operator. Then, at step 340, the first BS 110a determines its own first cell identity at least in part based on the received second cell identity. In this way, the determination of the first cell identity of the first BS 110a may utilize a cell identity of a surrounding BS 110d or 110g from a different operator. Thus, the potential cell identity confusion between the neighbor BSs 110a and 110d or 110g of the BS 110b from different operators may be avoided. It is to be understood that in response to the request, the first BS 110a, as usual, may also receive a cell identity of the first neighbor BS 110b itself and a cell identity of a neighbor BS 110c of the first neighbor BS 110b that also belongs to the first operator. Thereby, the cell identity collision and confusion between the BSs of the same operator may be avoided.

According to embodiments of the present invention, the determining of the first cell identity of the first BS 110a may be determined at any suitable timing. For example, the determination may be performed during an initial selection of the first cell identity upon the new deployment of the first BS 110a. Alternatively, the determination may be performed during a subsequent update of the first cell identity.

With respect to obtaining a cell identity of a neighbor BS of a different operator by the first neighbor BS 110b, any suitable approach may be used. The detailed process implemented by the first neighbor BS 110b will be described below with reference to FIGS. 4-6.

In order to further avoid the potential cell identity collision between the first BS 110a and its neighbor BS from the second different operator, in one embodiment, the first BS 110a may also receive from the first neighbor BS 110b a third cell identity of a third BS of the second operator. The third BS is adjacent to the second BS 110d or 110g. Then, the first BS 110a may determine the first cell identity based on the second cell identity of the second BS 110d or 110g and the third cell identity of the third BS.

By way of example, as shown in FIG. 2, the BS 110e or 110f of the second different operator is adjacent to the first BS 110a. Accordingly, there may be the problem of the cell identity collision between the first BS 110a and the BS 110e or 110f. However, the BS 110e or 110f is not a neighbor BS of the first neighbor BS 110b but a neighbor BS of the second BS 110d or 110g. If only a cell identity of a neighbor BS of the first neighbor BS 110b is received the first BS 110a from the first neighbor BS 110b, the first BS 110a cannot obtain the cell identity of the BS 110e or 110f. In this example, the first BS 110a may receive the third cell identity of the third BS 110e or 110f from the first neighbor BS 110b and then determine the first cell identity further based on the third cell identity of the third BS 110e or 110f. As a result, the potential cell identity collision between the first BS 110 and the BS 110e or 110f may be avoided.

Likewise, any suitable approach may be used by the first neighbor BS 110*b* to obtain the third cell identity of the third BS, such as the BS 110*e* or 110*f*. The detailed process implemented by the first neighbor BS 110*b* will also be described below with reference to FIGS. 4-6.

According embodiments of the present invention, the first BS 110*a* may receive the third cell identity of the third BS 110*e* or 110*f* from the first neighbor BS 110*b* at any suitable timing after sending the request of the neighbor cell identity of the first neighbor BS 110*b*. In one embodiment, the first BS 110*a* may receive from the first neighbor BS 110*b* the third cell identity of the third BS 110*e* or 110*f* along with the second cell identity of the second BS 110*d* or 110*g*. Alternatively or additionally, the first BS 110*a* may send to the first neighbor BS 110*b* a further request for a neighbor cell identity of the second BS 110*d* or 110*g* after receiving the cell identity of the second BS 110*d* or 110*g* from the first neighbor BS 110*b*. Then, in response to the further request, the first BS 110*a* may receive the third cell identity of the third BS 110*e* or 110*f* from the first neighbor BS 110*b*.

It would be appreciated that the network 100 may include a further BS of a different operator that is adjacent to the first BS 110*a*, and the further BS has no neighbor relationship with either the first neighbor BS 110*b* or the neighbor BS 110*d* or 110*g* of the first neighbor BS 110*b*. The operator deploying the third operator may be another operator different from the second operator or just the second operator. In this case, there is also the potential cell identity collision between the first BS 110*a* and the further BS.

In order to avoid such a cell identity collision, in one embodiment, as shown in FIG. 3, the method 300 may comprise step 330 where the first BS 110*a* detects a fourth cell identity of a fourth BS of a third operator. The third operator is different from the first operator, and may be the second operator or another different operator. The fourth cell identity is broadcast by the fourth BS. Then, the first BS 110 further determines the first cell identity based on the detected fourth cell identity.

According to embodiments of the present invention, the fourth BS may broadcast the fourth cell identity at any other suitable timing. For example, the fourth BS may broadcast the fourth cell identity periodically such that the first BS 110*a* may detect the fourth cell identity at any time it is needed. Furthermore, the fourth cell identity may be carried in any suitable broadcast message transmitted by the fourth BS. An example of the broadcast message includes, but is not limited to, a system information block (SIB). It should be appreciated that the periodic broadcasting and the SIB carrying the fourth cell identity as discussed above are only illustrative without suggesting any limitation. The scope of the present invention will not be limited in this regard.

In a further embodiment, in order to avoid the cell identity confusion between the first BS 110*a* and a neighbor BS of the fourth BS that also belongs to the third operator, the fourth BS may also broadcast the cell identity of its neighbor BS. Accordingly, the first BS 110*a* may detect the cell identity of the neighbor BS of the fourth BS such that the first cell identity of the first BS 110*a* may be further determined based on the cell identity.

In an even further embodiment, in order to reduce the overall probability of cell identity collision and confusion in the network 100, all of the BSs may have the function of broadcasting their own cell identities. Alternatively or additionally, a specific BS may also broadcast the cell identity of its neighbor of the same operator. In this way, a BS in the network 100 may directly detect the cell identity of a further BS from a further operator. Further, the BS may possible determine its own cell identity with reference to the cell identity utilized by the further operator.

In the case that all of the BSs broadcast its own cell identity and the cell identity of its neighbor BS as discussed above, the first BS 110*a* may directly detect the cell identities that are broadcast by other BSs in respective broadcast messages instead of requesting the first neighbor BS 110*b* for the neighbor cell identity. Then, the first BS 110*a* may determine the surrounding BSs based on the distances between the detected BSs and itself. For example, if the distance between a specific BS and the first BS 110*a* is below a predetermined distance threshold, the specific BS may be considered as a surrounding BS of the first BS 110*a*. Further, the first BS 110*a* may determine its own first cell identity based on the detected cell identities.

In this case, as shown in FIG. 3, the method 300 may comprise step 350 where the first BS 110*a* broadcasts the first cell identity upon the determination of the first cell identity. In this way, another BS of a different operator in the network 100 may use the first cell identity of the first BS 110*a* to determine a respective cell identity.

Figure 4:
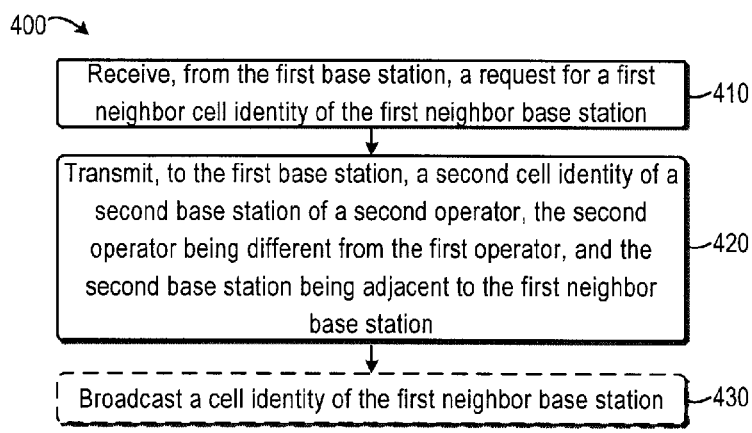
FIG. 4 shows a flowchart of a method implemented by a base station in accordance with another embodiment of the present invention.

FIG. 4 shows a flowchart of a method 400 implemented by a base station in accordance with another embodiment of the present invention. It would be appreciated that the method 300 may be implemented in any of the BSs 110*a*-110*h* as shown in FIG. 1 or 2. For the purpose of illustration, the method 300 will be described below from the perspective of the BS 110*b* with reference to FIG. 2.

As shown, the method 400 is entered at step 410, where a first neighbor BS 110*b* of the first BS 110*a* receives from the first BS 110*a* a request for a neighbor cell identity of the first neighbor BS 110*b*. The first BS 110*a* and the first neighbor BS 110*b* both belong to the first operator. As described above, the first neighbor BS 110*b* may receive the request from the first BS 110*a* via a direct communication interface therebetween, such as the X2 interface in the LTE network.

Next, the method 400 proceeds to step 420, where the first neighbor BS 110*b* transmits to the first BS 110*a* a second cell identity of a second BS of a second operator, such as the BS 110*d* or 110*g* as shown in FIG. 2. The second operator is different from the first operator, and the second BS 110*d* or 110*g* is adjacent to the first neighbor BS 110*b*. In this way, an effective and efficient way may be provided for the first BS 110*a* to be aware of a cell identity of a surrounding BS of a different operator. As described above, in response to the request, the first neighbor BS 110*b*, as usual, may also transmit to the first BS 110*a* its own cell identity and a cell identity of its neighbor BS 110*c* that also belongs to the first operator, such that the cell identity collision and confusion between the BSs of the same operator may be avoided.

According to embodiments of the present invention, the first neighbor BS 110*b* may obtain the cell identity of its neighbor BS 110*d* or 110*g* of the second operator in any suitable approach. In one embodiment, the second BS 110*d* or 110*g* may broadcast the second identity. Accordingly, the first neighbor BS 110*b* may directly detect the second identity in a broadcast message, such as the SIB, from the second BS 110*d* or 110*g*. Specifically, as described above, all of the BSs in the network 100 may have the function of broadcasting their own cell identities. In this case, the first neighbor BS 110*b* may detect a cell identity broadcast by a specific BS in the network 100. Based on the distance between the specific BS and the first neighbor BS 110*b*, the first neighbor BS 110*b* may determine whether the specific BS is its neighbor. The distance may be determined in any suitable way. For example, the first neighbor BS 110*b* may measure received signal strength of the specific BS. In response to the measured received signal strength being below a predetermined strength threshold, it may be determined that the specific BS is a neighbor BS of the first neighbor BS 110*b*.

In another embodiment, the first neighbor BS 110*b* may ask a terminal device 120 served by itself to detect the second cell identity of the second BS 110*d* or 110*g*. Specifically, the first neighbor BS 110*b* may send to the served terminal device 120 a request for measuring a neighbor BS of the first neighbor BS 110*b*. In response to the request, the terminal device 120 may detect a cell identity of the neighbor BS 110*d* or 110*g* of the first neighbor BS 110*b*, and then report the measured cell identity to the first neighbor BS 110*b*. According to embodiments of the present invention, the terminal device 120 may detect the cell identity of the second BS 110*d* or 110*g* of the second operator in any suitable way. The detailed operations of the terminal device 120 will be described below with reference to FIGS. 7-9.

According to embodiments of the present invention, the obtaining of the second cell identity of the second BS 110*d* or 110*g* may be performed by the first neighbor BS 110*b* at any suitable timing. In one embodiment, the obtaining may be event-triggered. For example, the obtaining may be performed by the first neighbor BS 110*b* in response to receiving from the first BS 110*a* the request for the second cell identity of the second BS 110*d* or 110*g*. Specifically, after receiving the request, the first neighbor BS 110*b* may detect the second cell identity in the broadcast message from the second BS 110*d* or 110*g*, or send the neighbor BS measurement request to the served terminal device 120.

In an alternative example, the obtaining may be periodic. For example, the first neighbor BS 110*b* may periodically detect the second cell identity in the broadcast message from the second BS 110*d* or 110*g*, or periodically send the neighbor BS measurement request to the served terminal device 120. In this way, the first neighbor BS 110*b* may transmit the second cell identity of the second BS 110*d* or 110*g* immediately after receiving the request from the first BS 110*a*. Accordingly, a response delay of the first neighbor BS 110*b* may be effectively and efficiently reduced.

As described above, as shown in FIG. 2, there may also be the problem of the cell identity collision between the first BS 110*a* and the BS 110*e* or 110*f* of the second operator that is not a neighbor BS of the first neighbor BS 110*b* but a neighbor BS of the second BS 110*d* or 110*g*. In order to avoid such a potential cell identity collision, in one embodiment, the first neighbor BS 110*b* may also transmit to the first BS 110*a* a third cell identity of a third BS 110*e* or 110*f* of the second operator, wherein the third BS 110*e* or 110*f* are adjacent to the second BS 110*d* or 110*g* of the second operator. Accordingly, the first BS 110*a* may possibly use both the second cell identity of the second BS 110*d* or 110*g* and the third cell identity of the third BS 110*e* or 110*f* in determining the first cell identity so as to effectively and efficiently avoid the potential cell identity collision and confusion.

As described above, the third cell identity of the third BS 110*e* or 110*f* may be transmitted by the first neighbor BS 110*b* to the first BS 110*a* at any suitable timing after receiving from the first BS 110*a* the request of the neighbor cell identity of the first neighbor BS 110*b*. For example, the first neighbor BS 110*b* may transmit to the first BS 110*a* the third cell identity of the third BS 110*e* or 110*f* along with the second cell identity of the second BS 110*d* or 110*g* in response to receiving the request for the neighbor cell identity to the first neighbor BS 110*b*. As an alternative example, the first BS 110*a* may send a further request for a neighbor cell identity of the second BS 110*d* or 110*g* to the first neighbor BS 110*b* after receiving the cell identity of the second BS 110*d* or 110*g*. In response to the further request, the first neighbor BS 110*b* may transmit to the first BS 110*a* the third cell identity of the third BS 110*e* or 110*f*.

According to embodiments of the present invention, the first neighbor BS 110*b* may obtain the third cell identity of the third BS 110*e* or 110*f* of the second operator in any suitable approach. In one embodiment, the second BS 110*d* or 110*g* may also broadcast a cell identity of a neighbor BS 110*e* or 110*f* of the second operator in addition to its own second cell identity. In this case, the first neighbor BS 110*b* may detect the third cell identity of the third BS 110*e* or 110*f* in the broadcast message from the second BS 110*d* or 110*g*. Alternatively, the first neighbor BS 110*b* may request the served terminal device 120 to detect the third cell identity of the third BS 110*e* or 110*f* in the broadcast message from the second BS 110*d* or 110*g*.

It is to be understood that in another embodiment, the third BS 110*e* or 110*f* may also broadcast its own third cell identity. Accordingly, the first neighbor BS 110*b* may detect by itself or request the served terminal device 120 to detect the third cell identity in the broadcast message from the third BS 110*e* or 110*f*.

Furthermore, the first neighbor BS 110*b* may obtain the third cell identity of the third BS 110*e* or 110*f* at any suitable timing. For example, similar to the obtaining of the second cell identity of the second BS 110*d* or 110*g*, the obtaining of the third cell identity of the third BS 110*e* or 110*f* may be event-triggered or periodic. Specifically, the obtaining may be performed by the first neighbor BS 110*b* in response to receiving from the first BS 110*a* the request for the neighbor cell identity of the first BS 110*b* or the further request for the neighbor cell identity of the second BS 110*d* or 110*g*. Alternatively, the obtaining may be periodically performed in order to reduce the response delay of the first neighbor BS 11*b*.

It would be appreciated that the excessively frequent obtaining of the cell identity of the surrounding BS 110*d*-110*g* of the second operator may consume a lot of energy of the first neighbor BS 110*b*, occupy limited system bandwidth, and increase system overhead. In order to reduce power consumption of the first neighbor BS 110*b* and the system bandwidth and overhead, in one embodiment, the cell identity obtained by the first neighbor BS 110*b* may be stored in a neighbor relation table (NRT). The NRT may be maintained locally at the first neighbor BS 110*b* or at an external device to which the first neighbor BS 110*b* has access. It would be appreciated that the use of the NRT is only illustrative without suggesting any limitation. The obtained cell identity may be stored in any other suitable mode. The scope of the present invention will not be limited in this regard.

An example of the NRT according to one embodiment of the present invention is shown below.

TABLE 1

| BS ID | Cell ID | Is the same operator? |
|---|---|---|
| 4 | 4 | Yes |
| 5 | 5 | Yes |
| 2 | 6 | No |
| 3 | 7 | No |

TABLE 2

| BS ID | Cell ID | Is the same operator? |
|---|---|---|
| 2 | 6 | No |
| 6 | 1 | No |

TABLE 3

| BS ID | Cell ID | Is the same operator? |
|---|---|---|
| 3 | 7 | No |
| 7 | 2 | No |

As shown, the NRT comprises three sub-tables including Tables 1 to 3. The neighbor relation of the first neighbor BS 110b is stored in Table 1. Each row shows one neighbor BS of the first neighbor BS 110b. The neighbor BS may be deployed by the first operator or by another operator different from the first operator. In a row of Table 1, the first column indicates a BS ID of the neighbor BS, the second column indicated a cell ID of the neighbor BS, and the third column indicates the operator deploying the neighbor BS.

As shown in FIG. 2, in addition to the first BS 110a, the first neighbor BS 110b has three neighbor BSs 110c, 110d and 110g, and accordingly each of the neighbor BSs 110c, 110d and 110g is shown in a row of Table 1. In this example, the second row with the BS ID "5" shows the neighbor BS 110c, the third row with the BS ID "2" shows the neighbor BS 110d, and the fourth row with the BS ID "3" shows the neighbor BS 110g. The second column lists a cell ID of a corresponding BS, and the third column indicates an operator that deploys the BS. As described above, the neighbor BS 110c is deployed by the first operator, and the neighbor BSs 110d and 110g are deployed by the second operator different from the first operator. As a result, the third columns of the second, third and fourth rows show "Yes," "no" and "no," respectively. It should be appreciated that the consistency indication of the operators is illustrative without suggesting any limitation. Alternatively, the third column may show an operator ID, such as a Public Land Mobile Network (PLMN) ID.

As shown, in addition to the above information on the neighbor BSs 110c, 110d and 110g, Table 1 also includes information on the first neighbor BS 110b itself in the first row. In this way, more complete neighbor relationship may be maintained.

Furthermore, Tables 2 and 3 respectively show the neighbor relationship of the two neighbor BSs 110d and 110g of the second operator. As shown in FIG. 2, the BS 110d has two neighbor BSs 110c and 110e, and the BS 110g has two neighbor BSs 110h and 110f. Tables 2 and 3 only include the neighbor BSs 110e and 110e from the second operator. Specifically, the row of Table 2 with the BS ID "6" shows the neighbor BS 110e, and the row of Table 3 with the BS ID "7" shows the neighbor BS 110f. As described above, Table 1 includes the neighbor BSs of the BS 110b from the first operator and a different operator. The exclusion of the neighbor BS from the same operator in Tables 2 and 3 may effectively and efficiently save limited storage resources. It should be appreciated that the exclusion as discussed above is only illustrative without suggesting any limitation. As an alternative example, Tables 2 and 3 may include the neighbor BSs of the BSs 110d and 110g from both the first operator and a different operator. As shown, Table 2 and Table 3 also include the information on the BSs 110d and 110g themselves at the first rows.

Tables 1, 2 and 3 are show as three separate sub-tables in this example. It should be appreciated that this is only for the purpose of illustration without suggesting any limitations. In some alternative embodiments, Tables 1, 2 and 3 may be integrated in to one table.

In the case that the NRT including the neighbor relationship of the first neighbor BS 110b is maintained, in one embodiment, the NRT may be transmitted from the first neighbor BS 110b to the first BS 110a. Specifically, the first BS 110a may request the first neighbor BS 110b for the NRT. Then, the first neighbor BS 110b may transmit the NRT to the first BS 110a. In this way, more comprehensive neighbor relation information may possibly be provided to the first BS 110a so as to avoid the potential cell identity collision and confusion.

According to embodiments of the present invention, the NRT may be transmitted in any suitable mode. For example, the first neighbor BS 110b may transmit Tables 1, 2 and 3 together in response to the NRT request from the first BS 110a. As an alternative example, the first neighbor BS 110b may transmit Table 1 including the neighbor relationship of the first neighbor BS 110b in response to the request for the neighbor cell identity of the first neighbor BS 110b from the first BS 110a. Then, in response to a further request for the neighbor relation of the BS 110d or 110g from the first BS 110a, the first neighbor BS 110b transmits Table 2 or 3 including the neighbor relationship of the neighbor BS 110d or 110g of the first neighbor BS 110b. In this transmission mode, the exclusion of the neighbor BS from the same operator in Tables 2 and 3 may effectively and efficiently save the system overhead.

Figure 5:
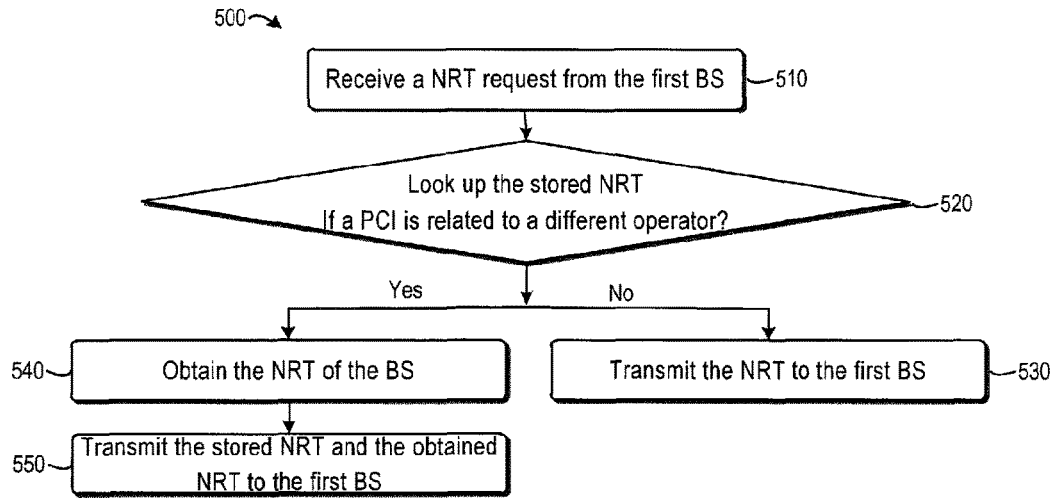
FIG. 5 shows a flowchart of a method implemented by a base station according to yet another embodiment of the present invention.

FIG. 5 shows a flowchart of a method 500 implemented by the first neighbor BS 110b according to yet another embodiment of the present invention. In this example, the NRT is requested by the first BS 110a and then transmitted by the first neighbor BS 110b to the first BS 110a.

As shown, the method 500 is entered at step 510 where the first neighbor BS 110b receives a NRT request from the first BS 110a. Then, at step 520, the first neighbor BS 110b looks up the locally stored NRT and determines whether a PCI is related to an operator different from the first operator. If no, the method 500 proceeds to step 530 where the first neighbor BS 110b transmits the NRT to the first BS 110a. If a specific BS in the NRT is deployed by a different operator, the first neighbor BS 110b obtains the NRT of the specific BS at step 540. Next, the method 500 proceeds to step 550 where the first neighbor BS 110b transmits the stored NRT and the obtained NRT to the first BS 110a.

According to embodiments of the present invention, the NRT of the specific BS may be obtained by the first neighbor BS 110b in any suitable approach. For example, similar to the process of obtaining the neighbor cell identity of the neighbor BS 110d or 110g by the first neighbor BS 110b, the specific BS may broadcast the NRT, and then the first neighbor BS 110b may detect by itself or request the served terminal device 120 to detect the NRT in the broadcast message from the specific NRT.

Still with reference to FIG. 4, the method 400 may also comprise step 430 where the first neighbor BS 110b broadcasts its own cell identity. By doing so, the neighbor BS of the first neighbor BS 110b, which is deployed by an operator different from the first operator, may determine the corresponding cell identity based on the cell identity of the first neighbor BS 110b. Accordingly, the potential cell identity collision and confusion therebetween may be avoided. Likewise, the first neighbor BS 110b may carry its cell identity in the broadcast message, such as the SIB.

Figure 6:
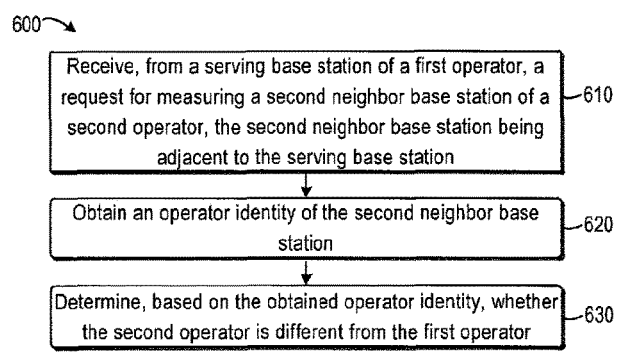
FIG. 6 shows a flowchart of a method implemented by a terminal device in accordance with one embodiment of the present invention.

FIG. 6 shows a flowchart of a method 600 implemented by a terminal device in accordance with one embodiment of the present invention. It would be appreciated that the method 600 may be implemented in the terminal device 120 in the network 100 as shown in FIG. 1. As described above, the terminal device 120 may be served by any suitable BS in the network 100. For the purpose of illustration, the method 300 will be described below from the perspective of the terminal device 120 that is served by the BS 110*b* as shown FIG. 1.

As shown, the method 600 is entered at step 610, where the terminal device 120 receives from a serving BS 110*b* of a first operator a request for measuring a second neighbor BS of a second operator. As used herein, the term "serving base station" or "serving BS" refers to a BS that is serving the terminal device 120. According to embodiments of the present invention, the second neighbor BS is adjacent to the serving BS 110, and the second operator may be the first operator itself or another operator different from the first operator. For example, the second neighbor BS may be the BS 110*c*, 110*d* or 110*g* as shown in FIG. 2.

According to embodiments of the present invention, the serving BS 110*b* may send the request to the terminal device 120 when intends to obtain its neighbor relationship. For example, the serving BS 110*b* may send the request after receiving from the first BS 110*a* a further request for the neighbor cell identity of the serving BS 110*b*. As described above, the first BS 110*a* and the serving BS 110*b* in the network 100 are neighbor BSs that are both deployed by the first operator. Alternatively, the request may be sent by the serving BS 110*b* to the terminal device 120 when handover of the terminal device 120 from the serving BS 110*b* to another BS is required in response to the movement of the terminal device 120.

Next, the method 600 proceeds to step 620, where the terminal device 120 obtains an operator identity of the second neighbor BS 110*c*, 110*d* or 110*g*. Then, at step 630, the terminal device 120 determines, based on the obtained operator identity, whether the second operator is different from the first operator. As used herein, the term "operator identity" or "operator ID" refers any suitable identity that may identify an operator. An example of the operator identity includes, but is not limited to, the PLMN ID that is broadcast by a BS in system information, such as the SIB. It would be appreciated that the operator identity may be transmitted by the BS in any other suitable way to indicate the operator. The scope of the present invention will not be limited in this regard.

By way of example, in the case that the request for a neighbor BS measurement is sent in response to a request for the neighbor cell identity of the serving BS 110*b* from the first BS 110*a* as described above with reference to FIGS. 3-5, the terminal device 120 may detect a cell identity of the second neighbor BS 110*c*, 110*d* or 110*g* in the synchronization signal from the second neighbor BS 110*c*, 110*d* or 110*g*. Then, using the detected PCI, the terminal device 120 decodes the system information from the second neighbor BS 110*c*, 110*d* or 110*g* to obtain the PLMN ID. Based on the PLMN ID, it may be determined the operator deploying the second neighbor 110*d* or 110*g* is different from the first operator. In this example, the terminal device 120 may transmit the obtained cell identity of the neighbor BS 110*d* or 110*g* to the serving BS 110*b*. In this way, a possible way may be provided for the serving BS 110*b* to obtain the cell identity of a neighbor BS 110*d* or 110*g* that is deployed by an operator different from the first operator.

As described above with reference to FIG. 2, the BS 110*e* adjacent to the BS 110*d* also surrounds the serving BS 110*b*. In this case, the terminal device 120 may also obtain a cell identity of the neighbor BS 110*e* of the second neighbor BS 110*d* and determine that the neighbor BS 110*e* belongs to the different operator by decoding the corresponding PLMN ID. Then, the terminal device 120 may send the cell identity of the neighbor BS 110*e* to the serving BS 110*b*. In this way, it is possible for the serving BS 110*b* to obtain the cell identity of a neighbor BS of its neighbor BS from the different operator.

Likewise, the terminal device 120 may determine whether a specific BS is a neighbor BS based on the distance between the specific BS and itself. For example, if the distance is below a predetermined distance threshold, the specific BS may be considered as a neighbor BS. Furthermore, the distance may be determined in any suitable way.

As described above, in one embodiment, the second neighbor BS 110*d* may broadcast the NRT including its neighbor relationship. In this case, the terminal device 120 may further detect the NRT broadcast by the second neighbor BS 110*d*, and then transmit the detected NRT to the serving BS 110*b*. By doing so, the serving BS 110*b* may obtain the more comprehensive neighbor information of the second neighbor BS 110*d*.

Figure 7:
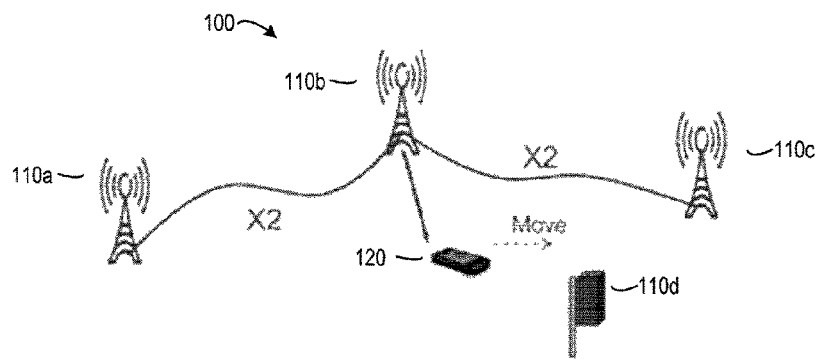
FIG. 7 shows an example scenario in which some embodiments of the present invention may be implemented.

As described above, the serving BS 110*b* may send the neighbor BS measurement request to the terminal device 120 when the terminal device 120 is required to be handed over to a neighbor BS with the movement of the terminal device 120. FIG. 7 shows an example of such a scenario according to one embodiment of the present invention. The network 100 as shown in FIG. 7 comprises four BSs 110*a*-110*d*. The BSs 110*a*-110*c* belong to the first operator, and the BS 110*d* belongs to the second different operator as described above with reference to FIG. 2.

As shown, the terminal device 120 is being served by the serving BS 110*b* and moving from the serving BS 110*b* towards the BS 110*c*. As a result, a handover from the serving BS 110*b* to the BS 110*c* may be expected. In this case, the serving BS 110*b* may send to the terminal device 120 a request for measuring a neighbor BS.

As described above, in order to meet the increasing demand for wireless broadband data, an operator may use unlicensed spectrums that may be shared by a plurality of operators. If the BSs 110*a*-110*c* of the first operator and the BS 110*d* of the second operator are all operating in a shared frequency band, the terminal device 120 may detect the cell identities from both the BSs 110*c* and 110*d*. As shown, with the moving of the terminal device 120, the terminal device 120 is increasingly going closer to the BS 110*d* of the second operator. If the BS 110*d* of the second operator has the same cell identity as the BS 110*a* of the first operator, the serving BS 110*b* will consider the detected BS 110*d* of the second operator as the BS 110*a* of the first operator, and then determine the BS 110*a* of the first operator as a handover target BS. As a result, the handover will be failed.

In order to ensure the success of the handover in this scenario, in one embodiment, if a neighbor BS may operate in a shared carrier, the terminal device 120 may obtain the operator identity of a neighbor BS. In the context of the present invention, the shared carrier may be any suitable carrier that can be shared among a plurality of operators. For example, the shared carrier may be an unlicensed carrier. Specifically, the terminal device 120 obtains the operator identity of a neighbor BS operating in an unlicensed carrier. As another example, the shared carrier may be a part of licensed frequencies. In this example, the licensed frequencies exclusive to one operator may be shared with another operator. In this case, the terminal device 120 obtains the operator identity of a neighbor BS operating in a shared part of licensed frequencies.

According to embodiments of the present invention, the carrier type of a neighbor BS to be measure may be indicated by the request for measuring a neighbor BS transmitted from the serving BS 110*b* to the terminal device 120. As used herein, the term "carrier type" refers to a type of a carrier that is used by a BS, including, for example, a licensed carrier type, an unlicensed carrier type, a shared carrier type, an unshared carrier type and the like. Specifically, if the carrier type is the shared carrier type, the terminal device 120 may obtain the operator identity of the measured neighbor BS. If the carrier type is the unshared carrier type, the terminal device 120 does not have to obtain the operator identity since the carrier is exclusive to a specific operator.

According to embodiments of the present invention, the indication of the carrier type may be implemented in any suitable approach. For example, in the LTE and/or LTE-A network, System Information Block Type 3 (SIB3) and System Information Block Type 5 (SIB5) are used by the BS to broadcast a carrier frequency to be measured during handover of the terminal device in an idle state. Accordingly, the carrier type may be carried in the SIB3 and/or SIB5. Example information elements of SIB3 and SIB5 are given as follows:

```
SystemInformationBlockType3 ::=         SEQUENCE {
    cellReselectionInfoCommon               SEQUENCE {
        q-Hyst                                  ENUMERATED {
                                                    dB0, dB1, dB2, dB3, dB4, dB5, dB6, dB8, dB10,
                                                    dB12, dB14, dB16, dB18, dB20, dB22, dB24},
        speedStateReselectionPars               SEQUENCE {
            mobilityStateParameters                 MobilityStateParameters,
            q-HystSF                                SEQUENCE {
                sf-Medium                               ENUMERATED {
                                                            dB-6, dB-4, dB-2, dB0},
                sf-High                                 ENUMERATED {
                                                            dB-6, dB-4, dB-2, dB0}
            }
        }                                                                           OPTIONAL
    },
    cellReselectionServingFreqInfo          SEQUENCE {
        s-NonIntraSearch                        ReselectionThreshold        OPTIONAL,
        threshServingLow                        ReselectionThreshold,
        cellReselectionPriority                 CellReselectionPriority
        carrierTypeIndicator
    }
}
SystemInformationBlockType5 ::=         SEQUENCE {
    interFreqCarrierFreqList                InterFreqCarrierFreqList,
    ...,
    lateNonCriticalExtension                OCTET STRING    (CONTAINING
SystemInformationBlockType5-v8h0-IEs)                       OPTIONAL    -- Need OP
}
SystemInformationBlockType5-v8h0-IEs ::=    SEQUENCE {
    interFreqCarrierFreqList-v8h0 SEQUENCE (SIZE (1..maxFreq)) OF InterFreqCarrierFreqInfo-
v8h0                        OPTIONAL,   -- Need OP
    nonCriticalExtension                    SEQUENCE { }                OPTIONAL -- Need OP
}
InterFreqCarrierFreqList ::=            SEQUENCE (SIZE (1..maxFreq)) OF InterFreqCarrierFreqInfo
InterFreqCarrierFreqInfo ::=            SEQUENCE {
    dl-CarrierFreq                          ARFCN-ValueEUTRA,
    carrierTypeIndicator
    q-RxLevMin                              Q-RxLevMin,
    p-Max                                   P-Max                       OPTIONAL,   --
```

As shown, in this example, "carrierTypeIndicator" for indicating the carrier type is added into the information element "cellReselectionServingFreqInfo" of SIB3 and the information element "InterFreqCarrierFreqInfo" of SIB5. Using such SIB3 and SIB5, the serving BS 110*b* may indicate to the terminal device 120 the carrier type of a specific carrier frequency to be measured.

As another example, for the terminal device 120 in a connected state, "carrierTypeIndicator" is added into the information element "MeasObjectEUTRA," which may be transmitted on a Physical Downlink Control Channel (PDCCH) in the LTE and LTE-A network and used by the BS to notify the terminal of the carrier frequency to be measured. An Example of this information element is given as follows:

```
MeasObjectEUTRA ::=         SEQUENCE {
    carrierFreq                 ARFCN-ValueEUTRA,
    carrierTypeIndicator
    allowedMeasBandwidth        AllowedMeasBandwidth,
    presenceAntennaPort1        PresenceAntennaPort1,
    neighCellConfig             NeighCellConfig,
```

-continued

```
    offsetFreq              Q-OffsetRange                    DEFAULT dB0,
    -- Cell list
    cellsToRemoveList       CellIndexList                    OPTIONAL,        -- Need
ON
    cellsToAddModList       CellsToAddModList                OPTIONAL,        -- Need
ON
    -- Black list
    blackCellsToRemoveList  CellIndexList                    OPTIONAL,        -- Need
ON
    blackCellsToAddModList  BlackCellsToAddModList           OPTIONAL,        -- Need
ON
    cellForWhichToReportCGI PhysCellId                       OPTIONAL,        -- Need
ON
    ...,
    [[measCycleSCell-r10    MeasCycleSCell-r10    OPTIONAL,        -- Need ON
        measSubframePatternConfigNeigh-r10   MeasSubframePatternConfigNeigh-r10   OPTIONAL
Need ON
    ]],
    [[widebandRSRQ-Meas-r11       ENUMERATED {enabled} OPTIONAL       -- Cond
WB-RSRQ
    ]]
}
```

In the handover scenario as discussed above with reference to FIG. 7, if the terminal device 120 determines that the neighbor BS 110d is deployed by the operator different from the first operator, the terminal device 120 may not transmit the cell identity of the neighbor BS 110d. Accordingly, the handover failure as described above may be avoided.

Furthermore, in order to reduce the power consumption of the terminal device 120, in one embodiment, the terminal device 120 may cease the measurement of the neighbor 110d after determining that the operator of the neighbor BS 110d is different from the first operator. For example, the terminal device 120 may stop measuring received signal strength of the neighbor BS 110d, such as Reference Signal Received Power (RSRP) and Received Signal Strength Indicator (RSSI) of the neighbor BS 110d.

As described above, the terminal device 120 may obtain the operator identity of the neighbor BS, such as the PLMN ID, by detecting the system information broadcast by the neighbor BS. It would be appreciated that the terminal device 120 may use any other suitable approach to obtain the operator identity of the neighbor BS. As another example, a mapping table of a cell identity to an operator may be used which includes the mapping relationship between the cell IDs and operator IDs. The mapping table may be stored locally in the terminal device or in an external device to which the terminal device 120 has access. The scope of the present invention will not be limited in this regard.

In this example, the terminal device 120 may first detect the cell identity of the neighbor BS of the serving BS 110b after receiving the neighbor BS measurement request. Then, the terminal device 120 may obtain the corresponding operator identity by looking up the mapping table. In this way, the terminal device 120 does not have to decode the PLMN ID in the system information, and thereby the power consumption of the terminal device 120 may be saved.

An example of the mapping table is given as below:

TABLE 4

| PCI | PLMN ID | Detection time |
|---|---|---|
| 1 | 46000 | 10:00:00 + 10 ms |
| 6 | 46000 | 10:00:01 + 20 ms |

TABLE 4-continued

| PCI | PLMN ID | Detection time |
|---|---|---|
| 106 | 46001 | 10:00:02 + 300 ms |
| 359 | 46000 | 10:00:03 + 600 ms |

In Table 4, one row shows the mapping of the PCI to PLMN ID of a BS. As shown, if the terminal device 120 detects the PCI "106," the terminal device 120 may look up Table 4 and find that the corresponding PLMN ID is "46001" which is different from the PLMN ID "46000" in other rows. Accordingly, it may be determined that the BS with the PCI "106" belongs to a different operator.

It is to be understood with the movement of the terminal device 120, the environment around the terminal device 120 may be changing. For example, a specific cell identity previously detected to identify a BS of an operator may be found to identify another BS of another operator later. In order to timely update the mapping relationship between the cell identity and the operator identity in the mapping table, in one embodiment, in the mapping table, the cell identity and the operator identity may be stored in associated with a predetermined time for indicating a next detection time of the operator identity. In response to expiration of the predetermined time, the terminal device 120 may detect the operator identity of the neighbor BS to be mapped to the corresponding cell identity.

Table 4 also shows an example of the predetermined time. As shown, the column "Detection Time" is used to indicate the next detection time of the PLMN ID. Specifically, for the PCI "1," the next detection time is 10:00:00+10 ms=10:00:01.

According to embodiments of the present invention, the time interval between two detections may be preset according to practical requirements. For example, when the terminal device 120 moves fast, the environment in which the terminal device 120 is located will be changed rapidly. Accordingly, the time interval may be set to be small.

Furthermore, the mapping table may store the mapping relationship in any suitable modes. In one embodiment, the mapping table may include only one table corresponding to all shared carriers. Alternatively, for the convenience of maintenance and lookup, the mapping table may include a plurality of sub-tables for respective shared carriers.

Figure 8:
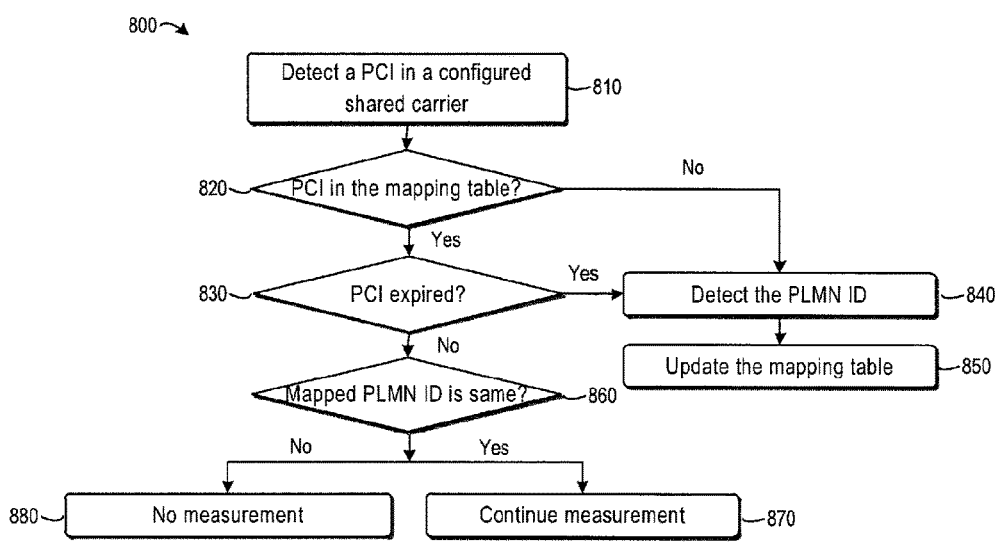
FIG. 8 shows a flowchart of method implemented by the terminal device according to another embodiment of the present invention.

FIG. 8 shows a flowchart of method 800 implemented by the terminal device according to another embodiment of the present invention. Likewise, the method 800 may be implemented in the terminal device 120 in the network 100 as shown in FIG. 1. In this example, the network 100 is the LTE network. Accordingly, the cell identity is PCI, and the operator identity is the PLMN ID.

As shown, the method 800 is entered at step 810 where the terminal device 120 detects a PCI in a configured shared carrier. Upon the detection of the PCI, the terminal device 120 looks up the mapping table of PCI to PLMN to determine whether there is the detected PCI in the mapping table at step 820. If so, the method proceeds to step 830 where the terminal device 120 determines whether the predetermined time in associated with the detected PCI is expired. In response to the expiration of the predetermined time, the method proceeds to step 840. If the terminal device 120 finds no detected PCI in the mapping table at step 820, the method 800 also proceeds to step 840. At step 840, the terminal device 120 detects the PLMN ID corresponding to the detected PCI. Upon the detection of the PLMN ID, the terminal device 120 updates the mapping table at step 850.

If it is determined at step 830 that the predetermined time is not expired, the method proceeds to step 860 where the terminal device 120 determines whether the PLMN ID mapped to the detected PCI is the same as or different from the PLMN ID of the serving BS 110b. If the PLMN ID is the same, the terminal device 120 continues the measurement of the BS at step 870. For example, the terminal device 120 may initiate measuring RSRP and RSSI of the BS. If the mapped PLMN ID is different, the terminal device 120 ceases the measurement of the BS at step 880.

Figure 9:
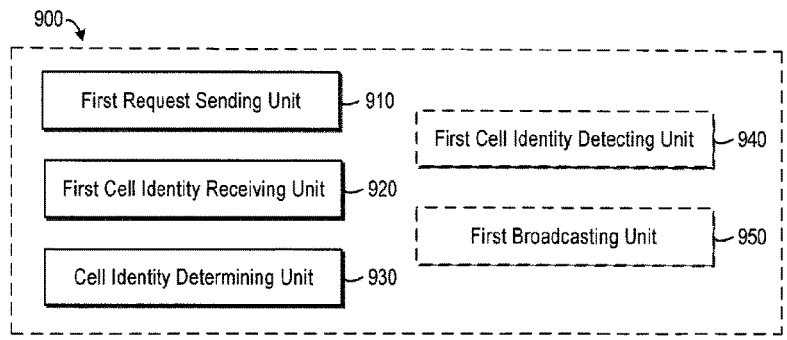
FIG. 9 shows a block diagram of a base station in accordance with one embodiment of the present invention.

FIG. 9 shows a block diagram of a base station 900 in accordance with one embodiment of the present invention. It would be appreciated that the base station 900 may be any of the BSs 110a-110h in the network 100 as shown in FIG. 1 or 2.

As shown, the base station 900 comprises a first request sending unit 910, a first cell identity receiving unit 920 and a cell identity determining unit 930. The first request sending unit 910 is configured to send, to a first neighbor base station of the first operator, a request for a neighbor cell identity of the first neighbor base station, the first neighbor base station being adjacent to the base station 900. The first cell identity receiving unit 920 is configured to receive, from the first neighbor base station, a second cell identity of a second base station of a second operator, the second operator being different from the first operator, and the second base station being adjacent to the first neighbor base station. The cell identity determining unit 930 is configured to determine the first cell identity at least in part based on the received second cell identity. An example of the cell identity includes, but is not limited to, a physical cell identity.

In one embodiment, the first cell identity receiving unit 920 may be further configured to receive a third cell identity of a third base station of the second operator, the third base station being adjacent to the second base station. Furthermore, the cell identity determining unit 930 may be further configured to determine the first cell identity at least in part based on the received second and third cell identities.

In one embodiment, the first request sending unit 910 may be further configured to send, to the first neighbor base station, a further request for a neighbor cell identity of the second base station. In this example, the first cell identity receiving unit 920 may be further configured to receive, from the first neighbor base station, a third cell identity of a third base station of the second operator, the third base station being adjacent to the second base station. Furthermore, the cell identity determining unit 930 may be further configured to determine the first cell identity at least in part based on the received second and third cell identities.

In one embodiment, the base station 900 may further comprise a first cell identity detecting unit 940. The first cell identity detecting unit 940 is configured to detect a fourth cell identity of a fourth base station of a third operator that is broadcast by the fourth base station, the third operator being different from the first operator. In this example, the first cell identity is further determined based on the detected fourth cell identity.

In one embodiment, the base station 900 may further comprise a first broadcasting unit 950. The first broadcasting unit 950 is configured to broadcast the determined first cell identity.

Figure 10:
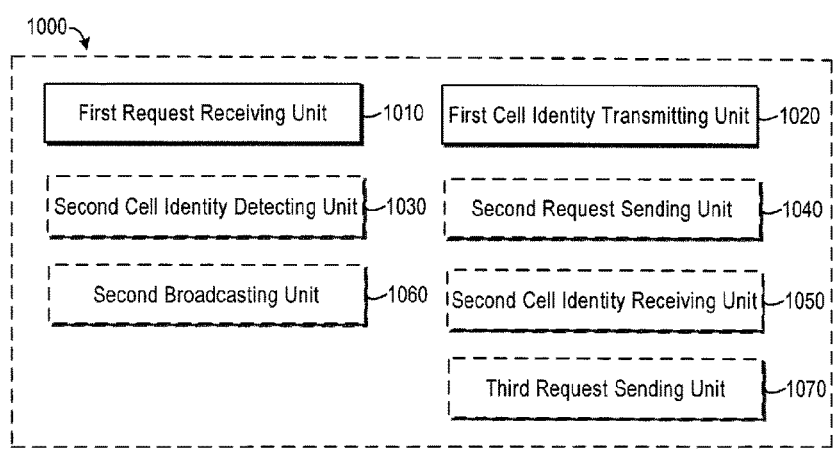
FIG. 10 shows a block diagram of a base station in accordance with another embodiment of the present invention.

FIG. 10 shows a block diagram of a base station 1000 in accordance with another embodiment of the present invention. It would be appreciated that the base station 1000 may be any of the BSs 110a-110h in the network 100 as shown in FIG. 1 or 2.

As shown, the base station 1000 comprises a first request receiving unit 1010 and a first cell identity transmitting unit 1020. The first request sending unit 1010 is configured to receive, from the first base station, a request for a first neighbor cell identity of the base station 1000. The first cell identity receiving unit 1020 is configured to transmit, to the first base station, a second cell identity of a second base station of a second operator, the second operator being different from the first operator, and the second base station being adjacent to the base station 1000. Likewise, the cell identity includes, but is not limited to, a physical cell identity.

In one embodiment, the base station 1000 may further comprise a second cell identity detecting unit 1030. The second cell identity detecting unit 1030 is configured to detect the second cell identity of the second base station that is broadcast by the second base station.

In one embodiment, the base station 1000 may further comprise a second request sending unit 1040 and a second cell identity receiving unit 1050. The second request sending unit 1040 is configured to send, to a terminal device, a request for measuring a second neighbor base station of the second operator, the second neighbor base station being adjacent to the base station 1000. The second cell identity receiving unit 1050 is configured to receive, from the terminal device, the second cell identity of the second base station.

In one embodiment, the first cell identity transmitting unit 1020 may be further configured to transmit a third cell identity of a third base station of the second operator, the third base station being adjacent to the second base station. In another embodiment, the first request receiving unit 1010 may be further configured to receive a further request for a neighbor cell identity of the second base station from the first base station. In this example, the first cell identity transmitting unit 1020 may be further configured to transmit the third cell identity of the third base station in response to receiving the further request.

In one embodiment, the base station 1000 may further comprise a second broadcasting unit 1060. The second broadcasting unit 1060 is configured to broadcast a cell identity of the base station 1000.

Figure 11:
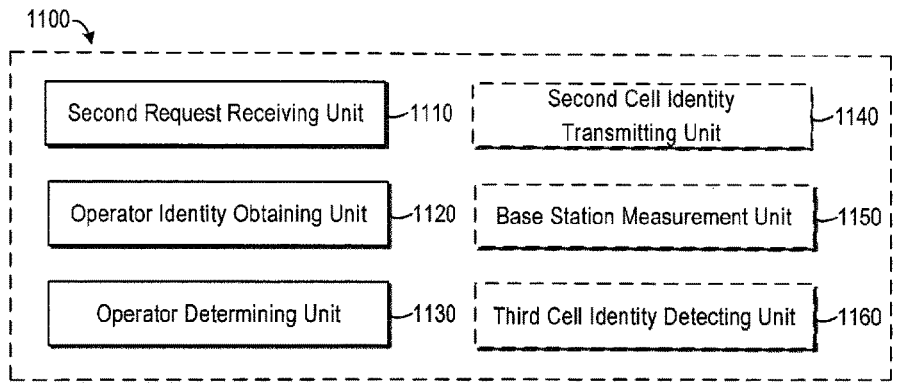
FIG. 11 shows a block diagram of a terminal device in accordance with one embodiment of the present invention.

In one embodiment, the base station 1000 may further comprise a third request sending unit 1070. The third request sending unit 1070 is configured to send, to a terminal device, a request for measuring a second neighbor base station of the second operator, the second neighbor base station being adjacent to the first neighbor base station, and the request indicating that a carrier type of the second neighbor base station is a shared carrier type FIG. 11 shows a block diagram of a terminal device 1100 in accordance with one embodiment of the present invention. It would be appreciated that the terminal device 1100 may be the terminal device 120 in the network 100 as shown in FIG. 1.

As shown, the terminal device 1100 comprises a second request receiving unit 1110, an operator identity obtaining unit 1120 and an operator determining unit 1130. The second request receiving unit 1110 is configured to receive, from a serving base station of a first operator, a request for measuring a second neighbor base station of a second operator, the second neighbor base station being adjacent to the serving base station. The operator identity obtaining unit 1120 is configured to obtain an operator identity of the second neighbor base station. The operator determining unit 1130 is configured to determine, based on the obtained operator identity, whether the second operator is different from the first operator. An example of the operator identity includes, but is not limited to, a PLMN ID.

In one embodiment, the terminal device 1100 may further comprise a second cell identity transmitting unit 1140. The second cell identity transmitting unit 1140 may be configured to transmit a cell identity of the second neighbor base station to the serving base station in response to the second operator being different from the first operator. In another embodiment, in response to the second operator being different from the first operator, the second cell identity transmitting unit 1140 may be further configured to transmit a further cell identity of a third neighbor base station of the second operator to the serving base station, the third neighbor base station being adjacent to the second neighbor base station.

In one embodiment, the request may indicate a carrier type of the second neighbor base station. In this example, the operator identity obtaining unit 1120 may be further configured to obtain the operator identity of the second neighbor base station in response to the carrier type being a shared carrier type.

In one embodiment, the terminal device 1100 may further comprise a base station measurement unit 1150. The base station measurement unit 1150 is configured to cease measuring the second neighbor base station in response to the second operator being different from the first operator.

In one embodiment, the operator identity obtaining 1120 unit may comprise a first operator identity detecting unit. The first operator identity detecting unit is configured to detect the operator identity of the second neighbor base station that is transmitted by the second neighbor base station.

In one embodiment, the terminal device 1100 may further comprise a third cell identity detecting unit 1160. The third cell identity detecting unit 1160 is configured to detect a cell identity of the second neighbor base station. In this example, the operator identity obtaining unit 1120 may comprise an operator identity retrieving unit configured to retrieve, based on the detected cell identity, the operator identity of the second neighbor base station from a mapping table of a cell identity to an operator identity. Additionally, the operator identity and the cell identity may be stored in associated with a predetermined time in the mapping table. In this case, the operator identity obtaining unit 1120 may comprise a second operator identity detecting unit. The second operator identity detecting unit is configured to, in response to expiration of the predetermined time, detecting the operator identity of the second neighbor base station that is transmitted by the second neighbor base station.

It should be appreciated that units included in the base stations 900 and 1000 and the terminal device 1100 correspond to the steps of the methods 300, 400, 500, 600 and 800. Therefore, all operations and features described above with reference to FIGS. 3 to 8 are likewise applicable to the units included in the base stations 900 and 1000 and the terminal device 1100 and have similar effects. For the purpose of simplification, the details will be omitted.

The units included in the base stations 900 and 1000 and the terminal device 1100 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the base stations 900 and 1000 and the terminal device 1100 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 12:
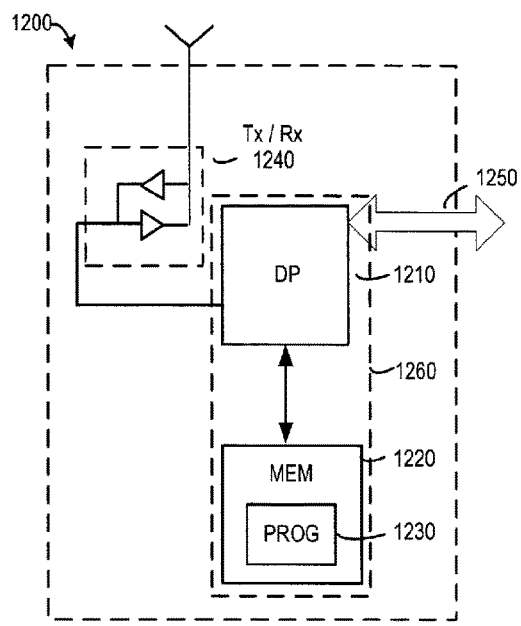
FIG. 12 shows a simplified block diagram of an apparatus that is suitable for use in implementing embodiments of the present invention.

FIG. 12 shows a simplified block diagram of an apparatus 1200 that is suitable for use in implementing embodiments of the present invention. It would be appreciated that the apparatus 1200 may be implemented by the BS 110a-110h as shown in FIG. 1 or 2 and the terminal device 120 as shown in FIG. 1.

As shown, the apparatus 1200 includes a data processor (DP) 1210, a memory (MEM) 1220 coupled to the DP 1210, a suitable RF transmitter TX and receiver RX 1240 coupled to the DP 1210, and a communication interface 1250 coupled to the DP 1210. The MEM 1220 stores a program (PROG) 1230. The TX/RX 1240 is for bidirectional wireless communications. Note that the TX/RX 1240 has at least one antenna to facilitate communication, though in practice an Access Node mentioned in this application may have several ones. The communication interface 1250 may represent any interface that is necessary for communication with other network elements, such as X2 interface for bidirectional communications between eNBs, S1 interface for communication between a Mobility Management Entity (MME)/Serving Gateway (S-GW) and the eNB, or Un interface for communication between the eNB and a relay node (RN).

The PROG 1230 is assumed to include program instructions that, when executed by the associated DP 1210, enable the apparatus 1200 to operate in accordance with the embodiments of the present invention, as discussed herein with the methods 300, 400, 500, 600 and 800 in FIGS. 3 to 8. The embodiments herein may be implemented by computer software executable by the DP 1210 of the apparatus 1200, or by hardware, or by a combination of software and hardware. A combination of the data processor 1210 and MEM 1220 may form processing means 1260 adapted to implement various embodiments of the present invention.

The MEM 1220 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 1200, there may be several physically distinct memory modules in the apparatus 1200. The DP 1210 may be of any type suitable to the local technical environment, and may include one or more of general purpose computers, special purpose computers, microprocessors, digital signal processors (DSPs) and processors based on multicore processor architecture, as non-limiting examples. The apparatus 1200 may have multiple processors, such as an application specific integrated circuit chip that is slaved in time to a clock which synchronizes the main processor.

Generally, various embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present invention can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present invention may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this invention, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present invention, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present invention has been described in language specific to structural features and/or methodological acts, it is to be understood that the present invention defined in the appended claims is not necessarily limited to the specific features or acts described above. Rather, the specific features and acts described above are disclosed as example forms of implementing the claims.

What is claimed is:

1. A first base station of a first operator, comprising:
   a processor; and
   a memory storing computer-executable instructions which, when executed by the processor, cause the first base station to:
      send, to a first neighbor base station of the first operator, a request for a neighbor cell identity of the first neighbor base station, the first neighbor base station being adjacent to the first base station;
      receive, from the first neighbor base station, information comprising:
         a second cell identity of a second base station of a second operator, the second base station being adjacent to the first neighbor base station; and
         an indication that the second operator of the second base station is different than the first operator; and
      determine a first cell identity of the first base station at least in part based on the received second cell identity.

2. The first base station according to claim 1, wherein the memory includes instructions which, when executed by the processor, configure the first base station to:
   receive a third cell identity of a third base station of the second operator, the third base station being adjacent to the second base station, and
   determine the first cell identity at least in part based on the received second and third cell identities.

3. The first base station according to claim 1, wherein the memory includes instructions which, when executed by the processor, configure the first base station to:
   send, to the first neighbor base station, a further request for a neighbor cell identity of the second base station;
   receive, from the first neighbor base station, a third cell identity of a third base station of the second operator, the third base station being adjacent to the second base station; and
   determine the first cell identity at least in part based on the received second and third cell identities.

4. The first base station according to claim 1, wherein the memory includes instructions which, when executed by the processor, configure the first base station to:
   detect a fourth cell identity of a fourth base station of a third operator different from the first operator, the fourth cell identity broadcast by the fourth base station; and
   determine the first cell identity at least in part the detected fourth cell identity.

5. The first base station according to claim 1, wherein the memory includes instructions which, when executed by the processor, configure the first base station to:
   broadcast the determined first cell identity.

6. The first base station according to claim 1, wherein the cell identity includes a physical cell identity.

7. A first neighbor base station of a first operator, the first neighbor base station being adjacent to a first base station of the first operator, comprising:
   a processor; and
   a memory storing computer-executable instructions which, when executed by the processor, cause the first neighbor base station to:
      receive, from the first base station, a request for a first neighbor cell identity of the first neighbor base station; and
      transmit, to the first base station, information comprising:
         a second cell identity of a second base station of a second operator, the second base station being adjacent to the first neighbor base station; and
         an indication that the second operator of the second base station is different than the first operator.

8. The first neighbor base station according to claim 7, wherein the memory includes instructions which, when executed by the processor, configure the first neighbor base station to: detect the second cell identity of the second base station that is broadcast by the second base station.

9. The first neighbor base station according to claim 7, wherein the memory includes instructions which, when executed by the processor, configure the first neighbor base station to:
   send to a terminal device, a request for measuring a second neighbor base station of the second operator, the second neighbor base station being adjacent to the first neighbor base station; and
   receive from the terminal device, the second cell identity of the second base station.

10. The first neighbor base station according to claim 7, wherein the memory includes instructions which, when executed by the processor, configure the first neighbor base station to: transmit to the first base station, a third cell identity of a third base station of the second operator, the third base station being adjacent to the second base station.

11. The first neighbor base station according to claim 10, wherein the memory includes instructions which, when executed by the processor, configure the first neighbor base station to: receive from the first base station, a further request for a neighbor cell identity of the second base station, wherein the third cell identity of the third base station is transmitted in response to the further request.

12. The first neighbor base station according to claim 7, wherein the memory includes instructions which, when executed by the processor, configure the first neighbor base station to: send to a terminal device, a request for measuring a second neighbor base station of the second operator, the second neighbor base station being adjacent to the first neighbor base station, and the request indicating that a carrier type of the second neighbor base station is a shared carrier type.

13. A terminal device, comprising:
   a processor; and
   a memory storing computer-executable instructions which, when executed by the processor, configure the terminal device to:
      receive, from a serving base station of a first operator, a request for measuring a second neighbor base station of a second operator, the second neighbor base station being adjacent to the serving base station;
      receive, from the serving base station, an indication of a carrier type associated with the second neighbor base station;
      in response to determining that the indication of the carrier type indicates a shared carrier, obtain an operator identity of the second neighbor base station; and
      determine, based on the obtained operator identity, whether the second operator is different from the first operator.

14. The terminal device according to claim 13, wherein the memory includes instructions which, when executed by the processor, configure the terminal device to: in response to the second operator being different from the first operator, transmit a cell identity of the second neighbor base station to the serving base station.

15. The terminal device according to claim 14, wherein the memory includes instructions which, when executed by the processor, configure the terminal device to: in response to the second operator being different from the first operator, transmit a further cell identity of a third neighbor base station of the second operator to the serving base station, the third neighbor base station being adjacent to the second neighbor base station.

16. The terminal device according to claim 13, wherein the request comprises the indication of the carrier type.

17. The terminal device according to claim 16, wherein the memory includes instructions which, when executed by the processor, configure the terminal device to: in response to the second operator being different from the first operator, cease to measure the second neighbor base station.

18. The terminal device according to claim 13, wherein the memory includes instructions which, when executed by the processor, configure the terminal device to: detect the operator identity that is transmitted by the second neighbor base station.

19. The terminal device according to claim 13, wherein the memory includes instructions which, when executed by the processor, configure the terminal device to:
   detect a cell identity of the second neighbor base station; and
   retrieve, based on the detected cell identity, the operator identity of the second neighbor base station from a mapping table of a cell identity to an operator identity.

20. The terminal device according to claim 19, wherein the operator identity and the cell identity are stored in association with a predetermined time in the mapping table, wherein execution of the instructions further configure the terminal device to: in response to expiration of the predetermined time, detect the operator identity of the second neighbor base station that is transmitted by the second neighbor base station.

* * * * *